(12) United States Patent
Tan (10) Patent No.: US 8,898,171 B2
(45) Date of Patent: *Nov. 25, 2014

(54) METHODS FOR EFFICIENTLY AND SYSTEMATICALLY SEARCHING STOCK, IMAGE, AND OTHER NON-WORD-BASED DOCUMENTS

(76) Inventor: Sizhe Tan, Berkeley, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 12/699,972

(22) Filed: Feb. 4, 2010

(65) Prior Publication Data

US 2010/0153402 A1 Jun. 17, 2010

Related U.S. Application Data

(63) Continuation of application No. 11/636,857, filed on Dec. 11, 2006, now Pat. No. 7,689,620.

(60) Provisional application No. 60/808,180, filed on May 24, 2006.

(51) Int. Cl.
*G06F 17/30* (2006.01)
*G06K 9/46* (2006.01)
*G06K 9/38* (2006.01)

(52) U.S. Cl.
CPC ........ *G06F 17/30247* (2013.01); *G06K 9/4609* (2013.01); *G06K 9/38* (2013.01); *G06F 17/30011* (2013.01); *G06K 9/4652* (2013.01)
USPC ........................................................ 707/741

(58) Field of Classification Search
USPC ........................................................ 707/741
See application file for complete search history.

(56) References Cited

U.S. PATENT DOCUMENTS

| | | | | |
|---|---|---|---|---|
| 5,010,581 A | | 4/1991 | Kanno | |
| 5,065,447 A | \* | 11/1991 | Barnsley et al. | 382/249 |
| 5,347,621 A | \* | 9/1994 | Yutaka | 345/593 |
| 5,438,628 A | \* | 8/1995 | Spitz et al. | 382/181 |
| 5,748,805 A | | 5/1998 | Withgott et al. | |
| 5,781,899 A | \* | 7/1998 | Hirata | 382/305 |
| 5,842,217 A | \* | 11/1998 | Light | 1/1 |
| 5,941,944 A | \* | 8/1999 | Messerly | 709/203 |
| 6,012,042 A | | 1/2000 | Black et al. | |
| 6,178,417 B1 | \* | 1/2001 | Syeda-Mahmood | 1/1 |
| 6,243,713 B1 | | 6/2001 | Nelson et al. | |
| 6,396,951 B1 | | 5/2002 | Grefenstette | |
| 6,853,991 B1 | | 2/2005 | Kermani | |

(Continued)

FOREIGN PATENT DOCUMENTS

CN 1495670 5/2004

*Primary Examiner* — Tony Mahmoudi
*Assistant Examiner* — Michael Le
(74) *Attorney, Agent, or Firm* — Our Pal Asija; Suganda Jutamulia (57) ABSTRACT

One embodiment of a non-word-based information retrieval system includes searching stock or image documents in a huge data source. A non-word-based document is first divided into a series of elements or an array of cells. Each element or cell is matched against a series of predefined token patterns, so that a match will generate a token having a name. The collection of the generated named tokens is a word-based representation of the non-word-based document. After tokens from all documents are collected in a master collection of tokens, the non-word-based documents can be efficiently and systematically searched in a manner analogous to a document search in a word-based search system.

11 Claims, 6 Drawing Sheets

(56) References Cited

U.S. PATENT DOCUMENTS 6,901,383 B1 5/2005 Ricketts et al.
2003/0126117 A1* 7/2003 Megiddo et al. .................. 707/3
2006/0080361 A1* 4/2006 Suzuki et al. .............. 707/104.1

* cited by examiner

Fig. 6

METHODS FOR EFFICIENTLY AND SYSTEMATICALLY SEARCHING STOCK, IMAGE, AND OTHER NON-WORD-BASED DOCUMENTS

RELATED APPLICATION

This is a continuation of application Ser. No. 11/636,857, filed Dec. 11, 2006, now U.S. Pat. No. 7,689,620, which claims the benefit of provisional patent application Ser. No. 60/808,180, filed May 24, 2006.

BACKGROUND

1. Field

One embodiment hereof relates to a document retrieval system, specifically to such a system which can search documents with images and stock market data, and other non-word-based documents.

2. Description of Prior Art

Recent progress of word-based information retrieval, especially related to an Internet document search, has been much more advanced than non-word-based information retrieval. Non-word-based information includes images in physics, medicine, geology, science, engineering, etc. Non-word-based information also includes stock market information, which is primarily represented by curves. In contrast to word-based information that contains strings of words, non-word-based information contains data over an n-dimensional space, and each datum comprises a plurality of values from m measurements, where m and n are integers.

With respect to word-based information, a word-based document consists of strings of words. Note that words may include regular words and other "words" such as email addresses, dates, numbers, URLs (uniform resource locators—Internet addresses), etc. For non-word-based information, such as stock market information, the data associated with a stock includes prices and transaction volume, which are usually represented in curves that show such parameters over time. While word-based documents can be quickly searched in a data source or even on the Internet, there is no way to search non-word-based stock market information related to a particular stock in a data source efficiently and systematically, not to mention searching such information on the Internet.

Some US patents disclose methods for stock market analysis and forecasting. U.S. Pat. No. 6,012,042 to Black et al. (Jan. 4, 2000) discloses a method for converting time-series-based data and non-time-series-based data of a stock into a unified format for stock market analysis. U.S. Pat. No. 6,853,991 to Kermani (Feb. 8, 2005) discloses a method for stock market forecasting based on fuzzy logic. U.S. Pat. No. 6,901,383 to Ricketts et al. (May 31, 2005) discloses another method for stock market forecasting by formulating stock purchase indices from last trading data. However, none of these systems are able to efficiently and systematically search and retrieve non-word-based stock market information. In other words, insofar as I am aware, there is no way to efficiently and systematically search non-word-based stock data in a data source or on the Internet in the way a word-based document is searched.

Other non-word-based information comprises images, including photographs and pictures. An image shows a value or a combination of values over a two-dimensional array. A picture can be a regular color picture taken by a camera, an X-ray picture, an infrared picture, an ultrasound picture, etc. Similarly, there is no efficient and systematic way to search a specific image of interest (e.g., an eye) embedded in an image document (e.g., a human face), which is stored in a stack of image documents (e.g., various pictures), not to mention an Internet search of such an image.

Some known searching methods are able to retrieve information from image documents, albeit inefficiently. U.S. Pat. No. 5,010,581 to Kanno (Apr. 23, 1991) discloses a method for retrieving an image document using a retrieval code, which is not an image. U.S. Pat. No. 5,748,805 to Withgott et al. (May 5, 1998) and U.S. Pat. No. 6,396,951 to Grefenstette (May 28, 2002) disclose methods for searching word-based documents by searching for an image of the word-based document, for example, an input from a scanner. The image is interpreted to provide a word-based meaning, for example using an OCR (optical character reader). However, insofar as I am aware there is no method for efficiently and systematically searching image data in a data source or on the Internet, as a word-based document is searched.

In general, non-word-based information contains data comprising a plurality of values obtained from m measurements over n-dimensional space. Stock data mentioned above comprises multiple values (various kinds of prices, transaction volume, etc.) over a one-dimensional space, which is time. A color picture has three values over a two-dimensional space, generally R, G, and B, representing red, green, and blue values over the space. Insofar as I am aware, there is also no efficient and systematic way to search information containing data that comprises m-values over n-dimensional space.

Traditionally, to detect an image of interest having $M^2$ pixels in an image document having $N^2$ pixels, where M and N can be any integers and N>M, a mathematical process called correlation is required, which includes $M^2 \times N^2$ steps of operation. If the data source contains k documents, $k \times M^2 \times N^2$ steps are needed. Similarly, to scan k documents in an n-dimensional pattern, $k \times M^n \times N^n$ steps are needed. The number of the steps needed increases exponentially as the size of document increases.

On the other hand, methods for searching word-based documents in a data source or on the Internet are widely known in the art and are used in word-based search engines. In principle, a basic way to search word-based documents can be explained as follows.

A data source contains a plurality of word-based documents: for example, Doc 1, Doc 2, Doc 3, Doc 4, . . . Doc n. These documents may be fetched or collected from the Internet.

A document consists of strings or words. For example, Doc 2 may include the words, ". . . He is a computer science professor at XYZ University. You may contact him at prof@xyz.edu. . . . "

Each document is decomposed, also known in the art as tokenized, into a collection of components or tokens. For example, the tokens of Doc 2 may include: computer, science, professor, xyz, university, contact, prof@xyz.edu, computer science, computer science professor, xyz university, etc.

The tokens of all documents are collected in a master collection of tokens for indexing. A list of documents containing a specific token can then be compiled. Each token has its own list. For example, for the token "university", a list might be: Doc 2, Doc 3, Doc 6, Doc 15, Doc 22; for the token "prof@xyz.edu", a list might be: Doc 2, Doc 25; etc.

When a query is presented, the query is also tokenized in the same way. The semantic collection of query tokens is searched over the indexed master collection of tokens. If the token "university" is found in a query, the search engine will return Doc 2, Doc 3, Doc 6, Doc 15, and Doc 22. If the query contains a logic operation among tokens such as "university" AND "prof@xyz.edu", the result will be Doc 2. And so on.

The order of the documents displayed may follow the matching scores. For example, the matching score may be determined by the frequency of token occurrence in the document, the position of token in the document, or other criteria.

When the matching document is displayed, the matching tokens, which are words, may be flagged or highlighted.

The main advantage of prior-art word-based document searches, which are based on tokenization, is that they are linear processes and contain no exponential complexity, so that the search can be performed efficiently and systematically.

To summarize, search methods used for word-based information retrieval are linear processes, which are efficient and systematic. However, these methods cannot be directly applied to non-word-based information. Insofar as I am aware, the only method available for non-word-based information retrieval has exponential complexity. Consequently, as far as I am aware, no method is available for efficiently and systematically searching stock data or image data, or other non-word-based data in a data source or on the Internet.

SUMMARY

In accordance with one embodiment, a non-word-based document is input into a tokenizer to generate a collection of tokens, where each token has a name. Since a non-word-based document is represented by a collection of named tokens, a word-based search engine can be used to search the non-word-based documents by searching the names of the tokens. In contrast to a word-based document search, in which tokens are simply words, the tokens of a non-word-based document represent attributes, such as a stock market event, a special image feature, etc. Thus a non-word-based document can be searched in response to queries such as, "What stock experienced a crash in year 2005?", "Which satellite picture shows a bridge?", etc.

Figure 1:
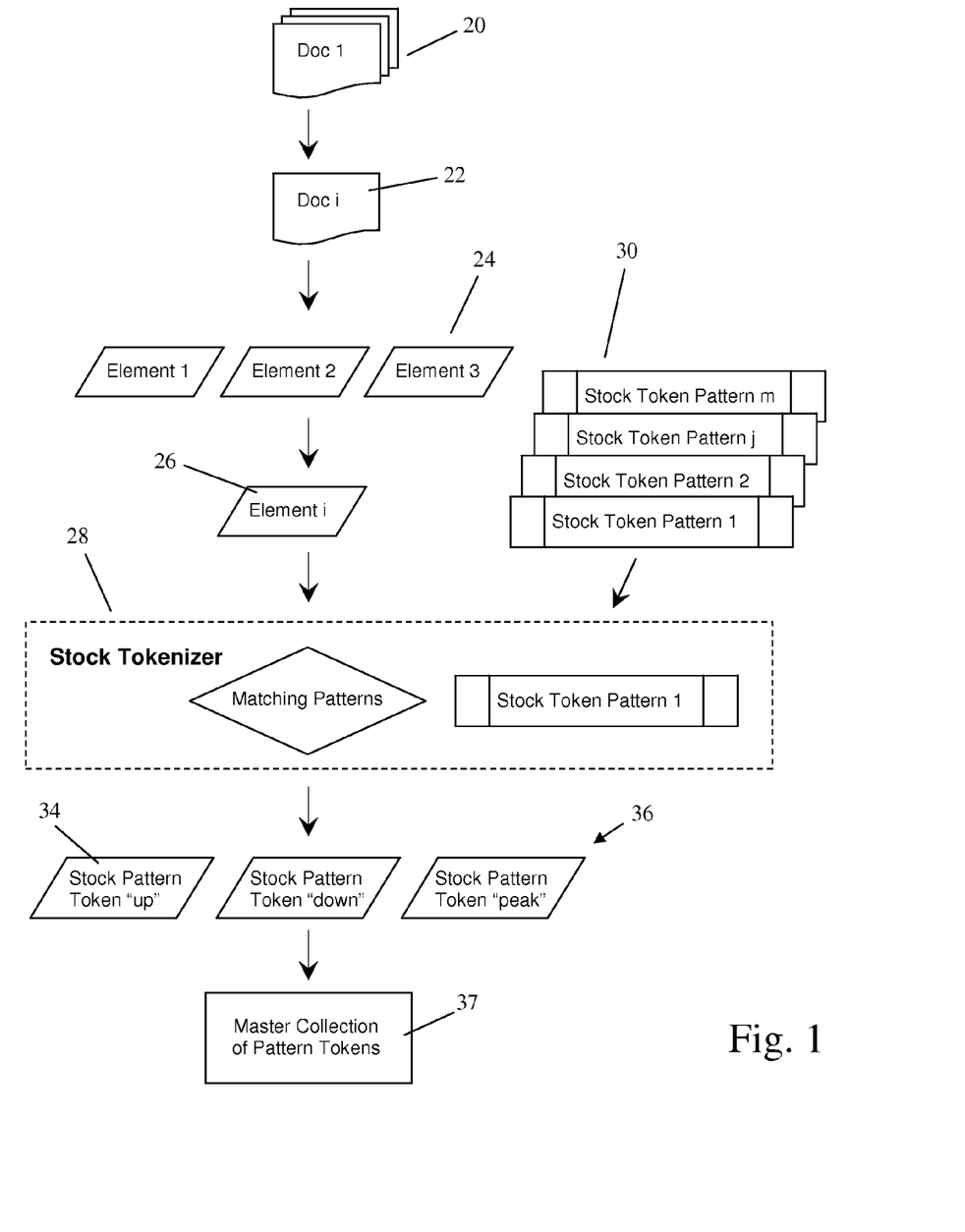
FIG. 1 shows a schematic diagram of a system for efficiently and systematically tokenizing stock documents, in accordance with one embodiment.
Figure 2:
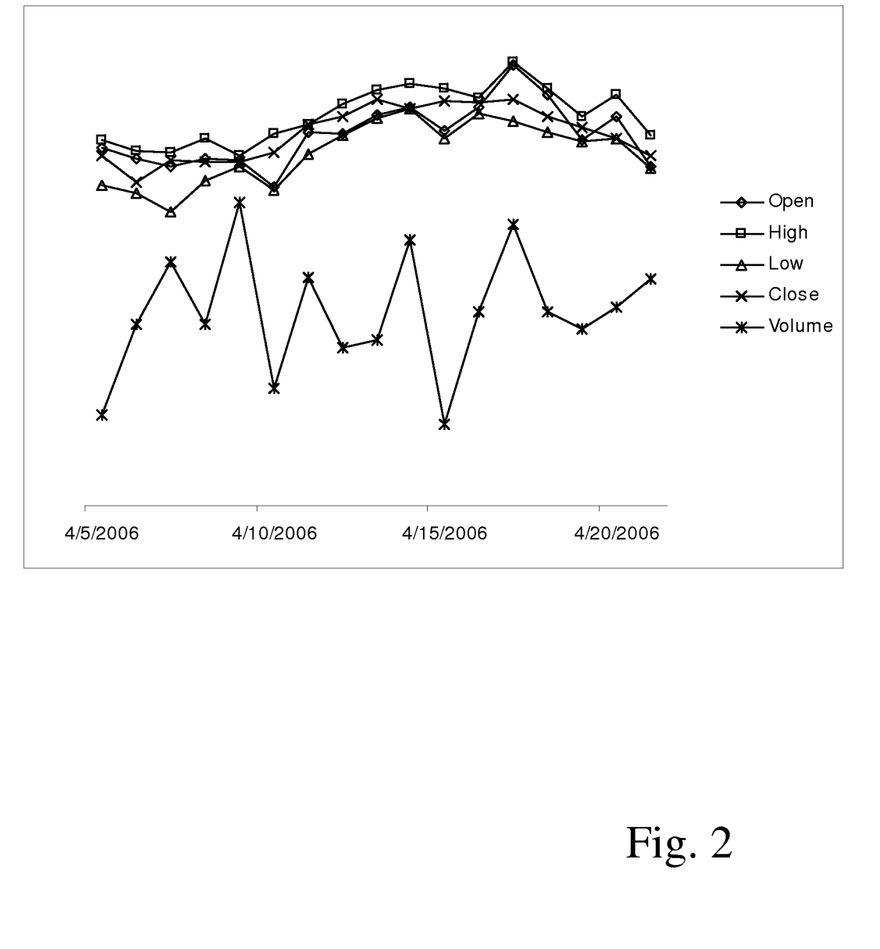
FIG. 2 shows a stock document (22 in FIG. 1) including an opening-price curve, a high-price curve, a low-price curve, a closing-price curve, and a transaction-volume curve, where the abscissa is time.
Figure 3:
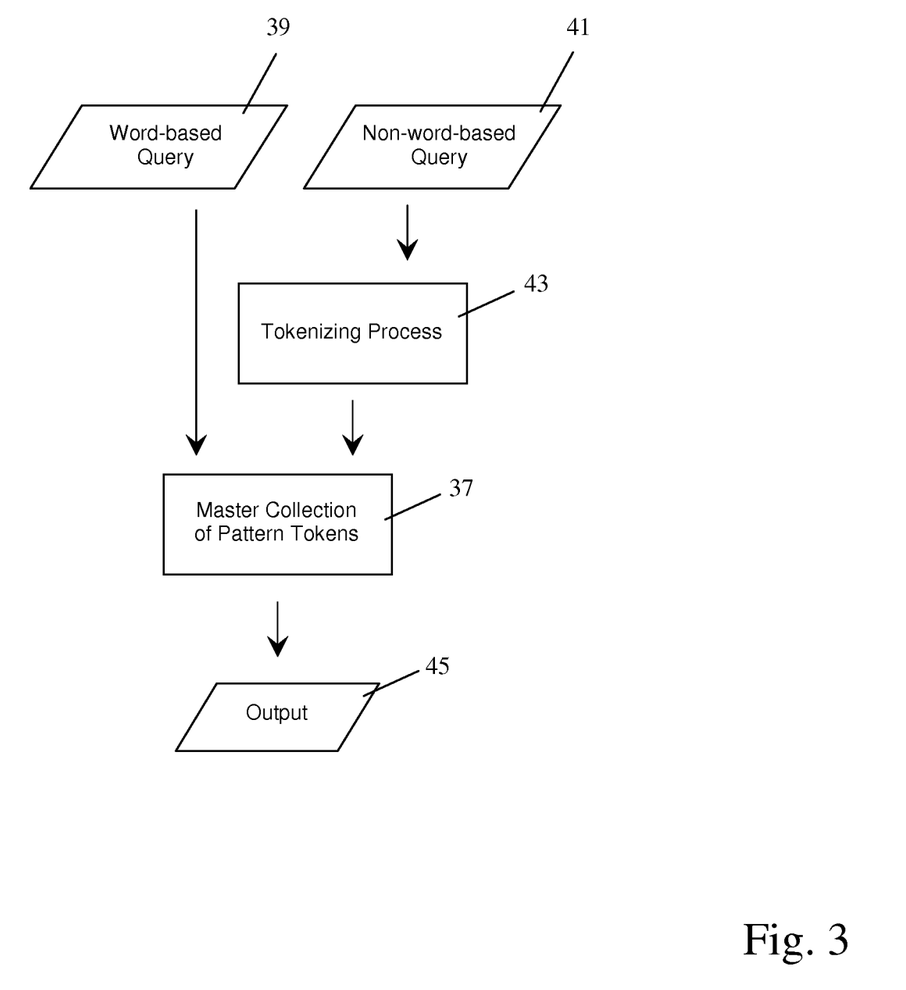
FIG. 3 shows a schematic diagram of a system for efficiently and systematically searching stock documents, in accordance with one embodiment.

DESCRIPTION—FIGS. 1, 2, and 3

One embodiment will now be described more fully with reference to a stock searching system diagrammed in the accompanying drawings, in which presently preferred exemplary embodiments are shown. Many other embodiments are possible and are discussed hereafter.

Stock market data consists of various items of information on every traded stock. For example, assume that stocks XYZ, ABC, DE, FGH, IJKL, etc, are of interest. The information on stock XYZ may contain non-word-based data and word-based data. The word-based data includes the basic facts about the company, such as founding date, address, names of officers, etc., in addition to financial reports, news releases, etc., published periodically or non-periodically. This part of word-based data can be searched using a word-based search engine known to those skilled in the art.

On the other hand, the non-word-based data includes, for each day, a curve plotting the opening prices of the stock (an opening-price curve), a high-price curve, a low-price curve, a closing-price curve, and a transaction-volume curve (FIG. 2). Since this part of non-word-based data is represented by curves, it cannot be directly searched using a word-based search engine.

A preferred exemplary embodiment for the stock search system is shown in FIGS. 1 and 3, which represent operations of a software program in a computer. In other words, FIGS. 1 and 3 show a flowchart for searching stock documents, in accordance with one embodiment. The searching is done by causing the software to process the data or documents stored in the same computer or in other locations linked by the Internet or an Intranet.

The stock search system is used to find a stock or stocks that have predetermined attributes. For example, a user may inquire what stocks experienced a crash (sharp reduction in price) in the year 2005. The stock search system of FIGS. 1 and 3 will output a list of stocks, e.g., ABC, FGH, XYZ, etc. that meet this criterion. Since the data is not in word format, the inquiry is not as simple as "what stocks have an opening price of $37", which can be searched using a word-based search engine.

FIG. 1—Tokenizing Process

FIG. 1 shows a tokenizing process, which is the first part of the non-word-based stock search system. A group of stock documents are collected to form a collection of stock documents 20. The documents can be collected from the Internet, or they are already in a supplied or available data source. Doc 1 is shown on top, followed by further documents (shown under or behind Doc 1). The documents in collection 20 will be processed one by one. FIG. 1 shows that a document 22, Doc i, is being processed. Document 22 is first divided into a series of elements 24, which will be explained in more detail later. Every element of series 24, such as element 26 (Element i), is input to a stock tokenizer 28 one by one.

Tokenizer 28 will produce a set of tokens for each document analogous to the operation of a tokenizer in a word-based search engine. The tokenizing process in a word-based search engine is a routine known to those skilled in the art. On the other hand, the tokenizing process for a non-word-based document search will now be described. Tokenizer 28 matches input element 26 against a series of predefined token patterns 30, including Token Pattern 1, Token Pattern 2, Token Pattern j, and Token Pattern m, which represent different attributes, such as price going up, price going down, price reaching peak, etc.

When tokenizer 28 matches input element 26 with Token Pattern 1, tokenizer 28 outputs a pattern token 34. A pattern token in non-word-based document search is analogous to a token in word-based document search. While in word-based document search, a token is simply a word or a combination of words, in non-word-based document search, a pattern token is not only represented by a word or name, it also carries an attribute. For example, a pattern token "up" has the name "up" for searching and it carries the attribute of a rising stock price. In other words, it is represented by the name or word "up", and it carries a token pattern or attribution that the stock price is rising up.

A token pattern is a reference pattern for finding a pattern token in a stock document. If a pattern recorded somewhere in the document matches with a given token pattern, a corresponding pattern token is extracted from that document. Thus a pattern token is a token, which represents a pattern, event, or attribute found in a document. For example, a token may represent an event of a price going up, a price going down, a price reaching a peak, etc, which is recorded in a stock document.

Each pattern token is provided with a name. In other words, a pattern token has a word-based name. In the example given above, the name can simply be "up" to show the attribute of a rising price. In fact, the name can be any word, which will be used in the same way such as a word-based token is used, in the searching process. For example, the token name can be "hello", but the token still carries an attribute of a rising price.

The tokenizer then again compares input element 26 repeatedly against Token Patterns 2, j, . . . m. If input element 26 is the same as any tested token pattern, a corresponding pattern token will be output, for example, pattern token "down", pattern token "peak", etc. The tokenizing process is again repeated for every other element of series 24.

Accordingly, document 22 will as stated be decomposed into a collection of pattern tokens 36. All documents in collection 20 are tokenized and decomposed into their pattern tokens. Finally, pattern tokens 36 from all documents in collection 20 are collected in a master collection of pattern tokens 37. Master collection 37 is then indexed and searched using a word-based search engine similar to a known word-based document search. One pattern token 34 in group 36 is analogous to a token in a word-based search engine.

FIG. 2—Stock Document

To better understand the embodiment mentioned above, an example of a stock search will now be discussed in more detail. Each stock is represented by a non-word-based document in a data source. Document 22 (FIG. 1), for example, XYZ stock, comprises a plurality of temporal curves showing opening prices, high prices, low prices, closing prices, and transaction volume as shown in FIG. 2.

As stated, the document is first divided into a series of elements 24 (FIG. 1). Since the document comprises temporal curves (FIG. 2), those curves are partitioned into a number of time windows, where each time widow is an element. There are a plurality of curves in a time window or an element. One of elements 24, element 26 (Element i), can be any time period, such as an hour, a day, a year, or a longer or shorter period. For exemplary purposes, each element is shown as a row in the following table.

| Ticker | Position | Date | Open | High | Low | Close | Volume |
|---|---|---|---|---|---|---|---|
| | ... | | | | | | |
| XYZ | 39 | 20060323 | 37.15 | 37.35 | 36.67 | 37.20 | 20794 |
| XYZ | 77 | 20060324 | 37.10 | 37.5 | 37.05 | 37.43 | 17853 |
| XYZ | 117 | 20060327 | 37.12 | 37.13 | 36.68 | 36.68 | 20197 |
| XYZ | 157 | 20060328 | 36.65 | 36.73 | 36.21 | 36.27 | 20066 |
| XYZ | 199 | 20060329 | 36.29 | 37.08 | 36.29 | 36.96 | 27279 |
| | ... | | | | | | |

Each element or row corresponds to a day, and is labeled by its byte position in the document file. Each row in the above table shows the stock data recorded in an element 26. The first column (ticker) is the name of stock, which is also the name of document. The second column is the byte position of element 26 in document file 22. The third column is the date when the data is recorded. The fourth, fifth, sixth, seventh, and eighth columns are the opening price, high price, low price, closing price, and transaction volume on the recorded date, respectively.

To illustrate the generation of token patterns 30, we will use the closing-price curve of FIG. 2 as an example, as shown below. Note that any curve or combination of curves can be used to generate token patterns 30 as well. A series of token patterns 30, which are labeled with their token names, can be defined as follows:

| Token name | Token pattern definition |
|---|---|
| "up" | closePrice - closePriceOfPreviousDay >0 |
| "down" | closePrice - closePriceOfPreviousDay <0 |
| "peak" | a "down" token follows an "up" token |
| "valley" | an "up" token follows a "down" token |
| "crash" | more than 5 "down" tokens follow each other |
| "downsignal" | overlap portion of "up" and "peak" |
| "up2% plus" | the daily change of closePrice >2% |

Each row in the table above shows a pattern token and the attribute it carries. The left column is the name of pattern token. The right column shows the attribute of pattern token. The right column actually also shows the token pattern, which is a reference pattern to find a pattern token.

For example, the second row shows a pattern token "up". It indicates that the closing price recorded on that day is higher than the closing price recorded on the previous day. I.e., in the right column of row 2, "closePrice—closePriceOfPreviousDay>0" will have a "yes" or ONE value where today's closing price less yesterday's closing price is greater than zero.

The third row shows pattern token "down". It is found by looking for a pattern where today's closing price is higher than yesterday's.

Pattern token "peak" in row 4 is positive ("yes" or ONE) if pattern token "up" is found on that day and pattern token "down" is found on the following day.

Pattern token "valley" (row 5) is positive if pattern token "down" is found on today and pattern token "up" is found tomorrow.

Pattern token "crash" (row 6) is determined by finding at least five consecutive "down" tokens started from that day.

Pattern token "downsignal" (row 7) is positive if pattern token "up" and pattern token "peak" are found on the same day.

Pattern token "up2% plus" (row 8) is positive if the closing price on that day is larger than the closing price on the previous day by 2%. And so on.

Note that a user can confidently define any token patterns which may best serve his or her need in stock searching, analysis, and forecasting.

In tokenizer 28, each element 26 of document 22 is matched against token patterns 30 shown in the table above. The tokenizer will thus output a collection of pattern tokens 36 as follows:

(name, ticker, startPositionInFile, endPositionInFile, tokenType)
(up, XYZ, 39, 77, type = stocktoken)
(up2% plus, XYZ, 39, 77, type = stocktoken)
(peak, XYZ, 39, 117, type = stocktoken)
(downsignal, XYZ, 39, 77, type = stocktoken)

```
(down, XYZ, 77, 117, type = stocktoken)
(down, XYZ, 117, 157, type = stocktoken)
(valley, XYZ, 117, 199, type = stocktoken)
(up, XYZ, 157, 199, type = stocktoken)
```

Each pattern token 34, shown in each row in the table below, has a word-based name, and carries information on a document name (ticker), start position in the document file, end position in the document file, and token type.

The second row shows that a token named "up" is found in document XYZ. The token starts and ends at positions 39 and 77, respectively, in the document file. The token is a stock pattern token.

The next row shows that a token named "up2% plus" is found in document XYZ. The token starts and end at positions 39 and 77, respectively, in the document file. The token is a stock pattern token.

The following row shows that a token named "peak" is found in document XYZ. The token starts and ends at positions 39 and 117, respectively, in the document file. The token is a stock pattern token. And so on.

In this way, stock document XYZ (document 22) is decomposed into a collection of pattern tokens 36. In other words, the collection of pattern tokens 36 shown in the table above is a representation of the stock document XYZ. Each pattern token 34 has a name, and carries an attribute and the information on its location, so that it resembles a token in a word-based search engine.

For example, another stock document ABC may have another collection of pattern tokens 36 as follows:

```
(name, ticker, startPositionInFile, endPositionInFile, tokenType)
(down, ABC, 43, 57, type = stocktoken)
(down, ABC, 57, 76, type = stocktoken)
(down, ABC, 76, 92, type = stocktoken)
(down, ABC, 92, 117, type = stocktoken)
(crash, ABC, 43, 117, type = stocktoken)
(up, ABC, 117, 199, type = stocktoken)
```

Similarly, the second to fifth rows show that four tokens named "down" are found in document ABC. The first "down" token starts and ends at positions 43 and 57, the second "down" token starts and ends at positions 57 and 76, the third "down" token starts and ends at positions 76 and 92, the fourth "down" token starts and ends at positions 92 and 117, in the document file. The "down" token is a stock pattern token.

The next row shows that a token named "crash" is found in document ABC. The token starts and end at positions 43 and 117, respectively, in the document file. The token is a stock pattern token.

The following row shows that a token named "up" is found in document ABC. The token starts and ends at positions 117 and 199, respectively, in the document file. The token is a stock pattern token.

In the following step, collections of pattern tokens 36 from all documents are combined to form master collection of pattern tokens 37, as follows:

```
(name, ticker, startPositionInFile, endPositionInFile, tokenType)
...
(up, XYZ, 39, 77, type = stocktoken)
(up2% plus, XYZ, 39, 77, type = stocktoken)
(peak, XYZ, 39, 117, type = stocktoken)
(downsignal, XYZ, 39, 77, type = stocktoken)
(down, XYZ, 77, 117, type = stocktoken)
(down, XYZ, 117, 157, type = stocktoken)
(valley, XYZ, 117, 199, type = stocktoken)
(up, XYZ, 157, 199, type = stocktoken)
(down, ABC, 43, 57, type = stocktoken)
(down, ABC, 57, 76, type = stocktoken)
(down, ABC, 76, 92, type = stocktoken)
(down, ABC, 92, 117, type = stocktoken)
(crash, ABC, 43, 117, type = stocktoken)
(up, ABC, 117, 199, type = stocktoken)
...
```

Each pattern token (which is a row in the table above as in two previous tables) has a word-based name. For example, "up", "up2%plus", "peak", "downsignal", "down", "valley", "crash", etc. Therefore, a pattern token can be searched by searching its name, similar to the token search in a word-based search engine. The token search in a word-based search engine is known to those skilled in the art.

FIG. 3—Searching Process

FIG. 3 shows a searching process used with the output of the tokenizer of FIG. 1. If a word-based query 39 is "crash", the name "crash" is searched over master collection of pattern tokens 37 (the first table above). Pattern tokens having the name "crash" (the 15$^{th}$ row in the table above) can be sorted using a word-based search engine. Stock document ABC containing token "crash" will be displayed as an output 45. Pattern token "crash" in document ABC (output 45) can be highlighted.

A query can be a non-word-based query 41, instead of a word-based query 39. In this case, non-word-based query 41 must go through a tokenizing process 43, similar to the tokenizing process of a stock document shown in FIG. 1 to generate a token or a collection of tokens. The semantic collection of token names of query 41 is then searched over master collection of tokens 37 to provide a plurality of matching documents with respective scores. If more than one matching documents are found, they are displayed in the order of their matching scores.

The exemplary query targets and the returns are shown in the table below. If the query is "crash", the output is stock document ABC, and the starting position of the matching token or attribute is position 43 in the ABC document file.

If the query is "peak", the output is stock document XYZ, and the starting position of the matching token is position 39 in the XYZ document file.

If the query is "down", there are two outputs, stock documents XYZ and ABC. There are two matching tokens in document XYZ, starting at positions 77 and 117 in the document file. There are four matching tokens in document ABC, starting at positions 43, 57, 76, and 92 in the document file. And so on. The following table depicts this:

| Query | Return |
|---|---|
| "crash" | document = "ABC", (start) position = 43 |
| "peak" | document = "XYZ", (start) position = 39 |
| "down" | document = "XYZ", (start) position = 77, 117 |
|  | document = "ABC", (start) position = 43, 57, 76, 92 |
|  | ... |

It is now apparent that after the tokenizing process (FIG. 1), non-word-based documents such as stock documents are represented by a master collection of tokens similar to word-based documents. Thus, they can be efficiently and systematically searched using a word-based search engine, as shown in the example given above, in accordance with one embodiment. The search is a linear process similar to a word-based document search.

Figure 4:
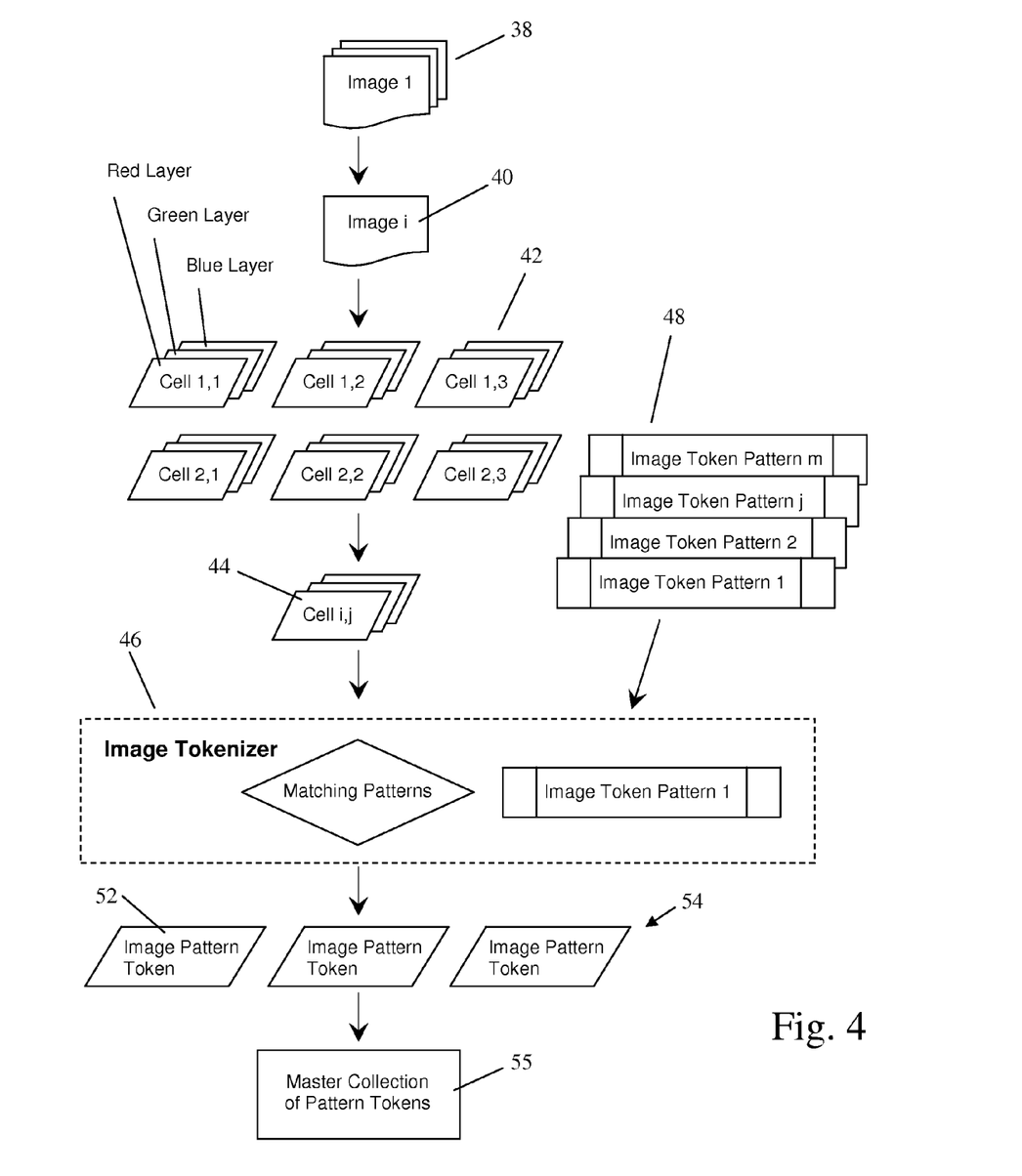
FIG. 4 shows a schematic diagram of a system for efficiently and systematically tokenizing image documents, in accordance with one embodiment.
Figure 5:
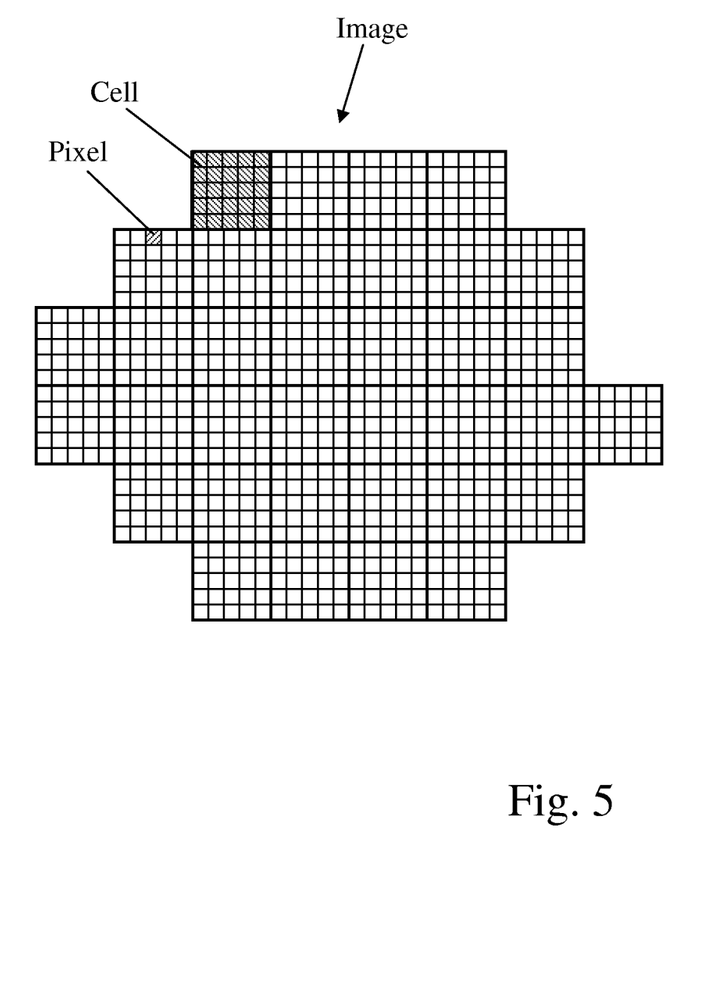
FIG. 5 shows an image (40 in FIG. 4) divided into an array of cells, which consists of a plurality of pixels, in accordance with one embodiment.
Figure 6:
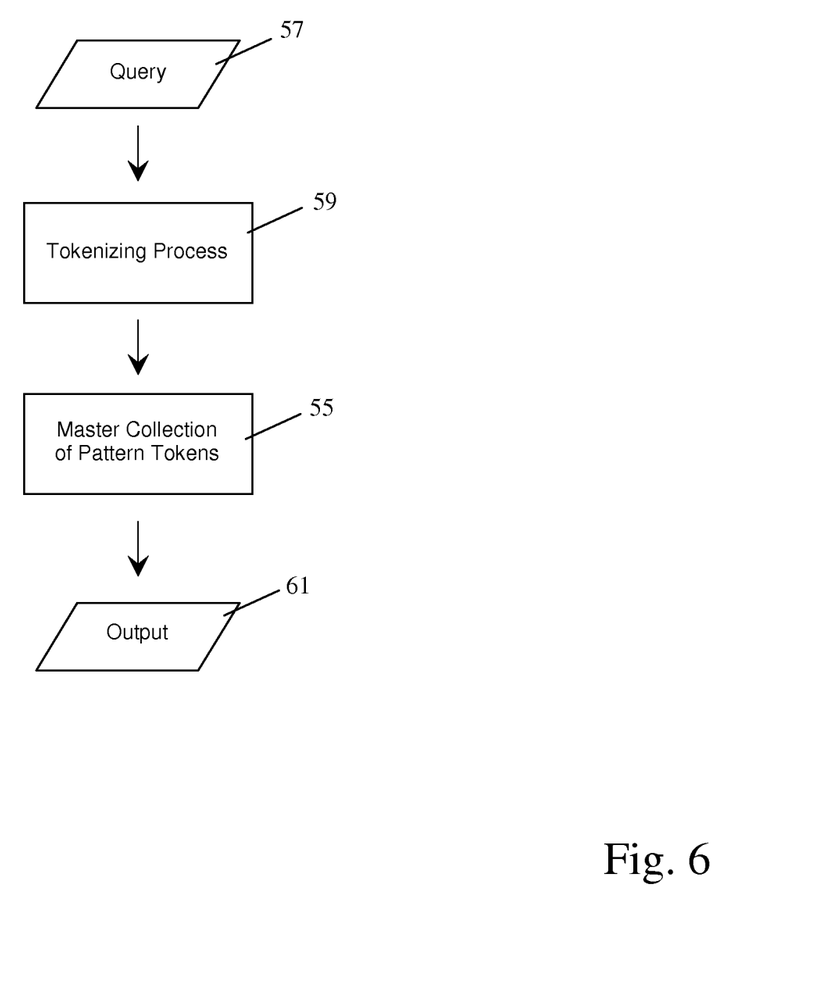
FIG. 6 shows a schematic diagram of a system for efficiently and systematically searching image documents, in accordance with one embodiment.

Description —FIGS. 4, 5, AND 6

FIGS. 1, 2, and 3 describe a non-word-based stock document search. On the other hand, a preferred exemplary embodiment of an image document search system is shown in FIGS. 4 and 6, which represent the operations of a software program in a computer. In other words, FIGS. 4 and 6 show a flowchart for searching image documents, in accordance with one embodiment. The searching is done by causing the software to process the data or documents stored in the same computer or in other locations linked by the Internet or an Intranet.

FIGS. 1 and 4 are systems for tokenizing stock and image documents, respectively. In FIG. 1, a stock document comprising a plurality of temporal curves (FIG. 2) is partitioned into a series of time windows. In FIG. 4, an image document is partitioned into an array of cells as shown in FIG. 5.

The image search system is used to find an image document or documents that contain a specific feature or pattern. For example, a user may inquire what maps (image documents) contain a specific landmark such as the Golden Gate bridge. The inquiry may be in the form of an aerial picture of the Golden Gate bridge. The image search system of FIGS. 4 and 6 will output a number of maps that contain picture of the Golden Gate bridge.

In another example, a collection of millions of satellite pictures are provided. A picture is then randomly picked up from the collection. The picture is cut into pieces. A piece of the picture is used as a reference or a query. The image search system of FIGS. 4 and 6 will be able to find the original picture to which the piece belongs, in a collection of millions pictures, and find the position of that piece in the sorted picture.

FIG. 4—Tokenizing Process

FIG. 4 shows the tokenizing process. A group of image documents are collected to form a collection of image documents 38. The documents can be collected from the Internet, or they are already in a supplied or available data source. Image 1 is shown on top, followed by further documents (shown behind Image 1). Each document in collection of documents 38 will be processed one by one. FIG. 4 shows that a document 40, Image i, is being processed. Image document 40 is first split into three color layers: Red, Green, and Blue. Each layer is then divided into an array of cells 42. Each cell is labeled by its position (i,j) in the array. A cell has three layers and thus it has Red, Green, and Blue values.

Every cell of array 42, such as Cell i,j or 44, is input individually to an image tokenizer 46. Tokenizer 46 will produce a set of tokens for each document analogous to the operation of a tokenizer in a word-based search engine. Tokenizer 46 matches input Cell i,j against a series of predefined token patterns 48, including Image Token Pattern 1, Image Token Pattern 2, Image Token Pattern j, and Image Token Pattern m, which represent different features or patterns in an image. For example, it might be the image of an eye in a human face.

When tokenizer 46 matches input Cell i,j or 44 with Image Token Pattern 1, tokenizer 46 outputs an image pattern token 52. An image pattern token in non-word-based image document search is analogous to a token in word-based document search. While in a word-based document search, a token is simply a word or a combination of words, in a non-word-based image document search, a pattern token is not only represented by a word or name, it also carries an attribute. For example, an image pattern token may have a name "R70_G20_B60" for searching purpose as we will see later. This name means average intensity in red is in the range of 70-79, green is in the range of 20-29, and blue is in the range of 60-69.

As stated, an image token pattern is a reference pattern for finding an image pattern token in an image document. If a portion of the image document matches with a given image token pattern, a corresponding image pattern token is extracted from that document. Thus an image pattern token is a token which represents a pattern, feature, or attribute found in a document. For example, a token may represent a tricolor intensity feature of a cell found in an image document. Each pattern token is provided with a name. In other words, a pattern token has a word-based name. In the example given above, the name can be "R70_G20_B60" to show that it features a tricolor intensity such that average intensity in red is in the range of 70-79, green is in the range of 20-29, and blue is in the range of 60-69. In fact, the name can be any word, which will be used in the same way as a word-based token is used in the searching process.

The tokenizer then again compares input Cell i,j or 44 repeatedly against Image Token Patterns 2, j, . . . m. If input Cell i,j or 44 is the same as the tested image token pattern, a corresponding image pattern token will be output, for example, pattern token "R90_G210_B60", pattern token "R80_G140_B160", etc. The tokenizing process is again repeated for every other cell of image document 40.

Accordingly, image document 40 will be decomposed into a collection of image pattern tokens 54. All documents in collection 38 are tokenized and decomposed into their image pattern tokens. Finally, image pattern tokens 54 from all documents in collection 38 are collected in a master collection of image pattern tokens 55. Master collection 55 is then indexed and searched over using a known word-based search engine similar to the known word-based document search.

FIG. 5—Array of Cells

An example of image document search is given in the following discussion to better understand the embodiment shown in FIG. 4. For example, assume that image document 40 shows a bucket of flowers in a garden (not shown). The document is named Flower in the following discussion.

Image document Flower is partitioned by a grid to form an array of cells as shown in FIG. 5. Each cell further consists of a plurality of pixels. For example, a cell consists of 5×5 pixels. Its values in the Red layer are shown in the following table:

| 36 | 148 | 220 | 84 | 56 |
|----|-----|-----|-----|-----|
| 44 | 180 | 228 | 124 | 22 |
| 34 | 44 | 124 | 44 | 0 |
| 30 | 123 | 127 | 12 | 12 |
| 12 | 12 | 110 | 12 | 12 |

The whole table shown above is an exemplary Cell i,j or 44. The table has five columns and five rows, making 25 squares. Each square is a pixel of Cell i,j or 44. Cell i,j or 44 has 25 pixels. The number in each square indicates the Red layer value (intensity in red) in that pixel.

A variety of image feature stripping methods, alone or in combination, can be used to define the desired image token patterns 48 (FIG. 4). For example, one may use a method that simply takes an average over all pixel color values in a cell. The average Red value of the cell shown in the table above is 74.

For example, an image token pattern (from series of patterns 48) is defined as a cell having average Red, Green and Blue values 74, 23, and 66, respectively. Accordingly, a name such as R74_G23_B66 can be provided for the image pattern token that matches this image token pattern.

Furthermore, one may take tolerance into consideration as follows. To prevent a small difference in pixel color resulting in totally different tokens, one may group color values into units of multiple of ten. Instead of R74_G23_B66, we use R70_G20_B60, which means average Red value in the range of 70-79, average Green value in the range of 20-29, and average Blue value in the range of 60-69.

By matching each cell of the document against the defined image token patterns 48, image tokenizer 46 will output a collection of image pattern tokens 54 as follows:

```
(name, document, position-i, position-j, token type)
(R70_G20_B60, Flower, 1, 1, type = imagetoken)
(R70_G30_B60, Flower, 1, 2, type = imagetoken)
(R75_G23_B66, Flower, 1, 3, type = imagetoken)
...
```

The image pattern token has a word-based name, and carries information on document name, position-i in array, position-j in array, and token type. A row shows an image pattern token. The first item is the name of token such as R70_G20_B60. The second item is the name of image document such as Flower, where token R70_G20_B60 is found. Two following items are position-i and position-j, such as 1,1, which indicates the position of token R70_G20_B60 in the document Flower. The last item shows that token R70_$_{G20}$_B60 is an image pattern token.

Unlike stock tokens, the names of image tokens need not to be very readable to humans, since the query is also an image and will also be tokenized in the same way. In the following step, collections of image pattern tokens 54 from all documents are combined in a master collection of image pattern tokens 55.

The name of an image pattern token can be very long when complex image feature stripping methods are applied and a lot of information must be represented. In computer technology, such a very long name can be transformed into a 32-byte SHA (Secure Hash Algorithm) string. Therefore, the name of an image pattern token after transformation will be 32 bytes long or shorter.

For example, assume image document Flower is divided into a 4×5 cell array. For simplicity, further assume each cell, after tokenizing, has a single image pattern token. In general, a cell may have a plurality of image pattern tokens, and an image pattern token may be formed by a plurality of cells. Document Flower can be expressed by an array of words like a crossword board as follows:

| R70_G20_B60 | R70_G30_B6 | R80_G20_B50 | R70_G20_B90 |
|---|---|---|---|
| R80_G120_B50 | R80_G210_B90 | R100_G30_B60 | R70_G120_B150 |
| R90_G130_B60 | R70_G200_B80 | R80_G20_B70 | R80_G140_B160 |
| R170_G120_B70 | R90_G210_B60 | R70_G30_B60 | R80_G110_B190 |
| R30_G20_B160 | R70_G220_B60 | R80_G20_B10 | R70_G210_B90 |

A row is similar to a sentence consisting four words. The first sentence has four words: R70_G20_B60, R70_G30_B60, R80_G20_B50, and R70_G20_B90. The second sentence is exactly under the first sentence, meaning that the first, second, third, and fourth words of the second sentence are exactly under the first, second, third, and fourth words of the first sentence, respectively. And so on.

The crossword board shown above is not an image, but it represents the image document Flower for image document search purposes, as will be seen later.

In other words, we have transformed a non-word-based document into a word-based representation. The word-based representations of a huge number of such images are then stored in master collection 55, such that an efficient and systematic image search can be performed similar to a word-based document search. The software for word-based search engine is known to those skilled in the art.

FIG. 6—Searching Process

FIG. 6 shows the searching process. Suppose a query 57 is a part of document Flower, which may be called image Partial_Flower. Further suppose image Partial_Flower is a 2×2 cell array. We want to search all image documents that contain the query target image Partial_Flower.

After query 57 passes through a tokenizing process 59 in the same way as shown in FIG. 4, each cell of query 57 has an image pattern token. Query 57 or image Partial_Flower is now expressed by the following crossword board, in which a token is considered a word:

| R70_G200_B80 | R80_G20_B70 |
|---|---|
| R90_G210_B60 | R70_G30_B60 |

Thus the query is not an image anymore: it has become an array of words. The query now consists of two sentences, arranged one on the top of other. Each sentence has two words. The first sentence is R70_G200_B80 and R80_G20_B70. The second sentence is R90_G210_B60 and R70_G30_B60.

After this word-based representation of query 57 is available as shown above, the search is similar to a word-based document search, which is based on the search of the semantic collection of token names of query 57 over master collection of tokens 55 to provide a plurality of matching documents with respective scores. A word-based search engine will search a sentence with two words, such as

| R70_G200_B80 | R80_G20_B70 |
|---|---| and another sentence with two words such as

| R90_G210_B60 | R70_G30_B60 |
|---|---|

The second sentence must be exactly under the first sentence.

The search result will be as follows:

| Query image | Return |
| --- | --- |
| "Partial_Flower" | document="Flower", (top-left corner) position = Cell 3, 2 |
| | ... |

Image document Flower containing the query image Partial_Flower at Cell 3,2 is found from a large collection of image documents and displayed as an output 61. The position of the top-left corner of image Partial_Flower is at Cell 3,2. Image Partial_Flower in image Flower, which matches the query image, can be highlighted. If more than one matching documents are found, they are displayed in the order of their matching scores.

It is now apparent that after the tokenizing process, non-word-based documents such as image documents can be efficiently and systematically searched using a word-based search engine, in accordance with one embodiment. The image search is now an efficient and systematic linear process and does not involve exponential complexity anymore.

Since a query image and an image document are mutually independent, it is important to pick a right reference point, say (x0, y0), to divide the query image Partial_Flower into an array of cells to overlap the cells of image document Flower. The reference point selection is a partial trial-and-error process. A partial search of a few testing tokens can quickly reject a bad choice of a reference point. The number of computational trials is never more than the number of pixels in a cell. One may try each pixel as the reference point once and use the best one to proceed. In above example, 25 trials (5×5) will be adequate to guarantee that the correct reference point will be found.

Furthermore, advanced word-based search engines have the capability to suggest a set of token names that are in the index and make the closest fit to a query term specified by a query user. Such a capacity can be utilized to handle uncertainty elements in image token names caused by tolerance considerations, in accordance with one embodiment.

CONCLUSION, RAMIFICATIONS, AND SCOPE

Accordingly, the reader will see that the above systems can search non-word-based documents efficiently and systematically. The non-word-based document is transformed into a collection of named tokens through a tokenizing process. The embodiments provide an efficient and systematic stock search for stock market analysis or forecasting, and an efficient and systematic image search from a huge data source. They will also increase the ability to search documents comprising m values or parameters over n-dimensional space efficiently and systematically.

The non-word-based stock and image documents may also contain word-based data. The word-based data in an image document include the title, author, date, index of the image, etc.

As mentioned previously, the example of stock data given above comprises multiple values or parameters over a one-dimensional space. The example of color image data given above comprises three values (RGB) over a two-dimensional space. In principle, any data comprising m-values over n-dimensional space can be tokenized to generate a collection of named tokens, which can then be searched using a word-based search engine. A word-based search engine is known to those skilled in the art. Using these token names or their semantic combination, documents containing the non-word-based data with m-values over n-dimension space can be efficiently and systematically searched in a data source or on the Internet, in accordance with one embodiment.

Although the description above contains many specificities, these should not be construed as limiting the scope of the invention but as merely providing illustrations of some of the presently preferred embodiments of this invention.

Many variations are possible. The system can be used for medical, engineering, scientific, and other applications. By understanding the description given above, one skilled in the art can find a variety of means for tokenizing a non-word-based document within the scope and spirit of the embodiments. For example, instead of taking an average color value in the cell, the cell can be approximated by a tilted plane in the color space, which is characterized by a pair of orthogonal slopes. The token can be written as "n108_12", meaning that the north-south slope is negative 108 (north-pixel value minus south-pixel value is −108) and the west-east slope is 12 (west-pixel value minus east-pixel value is 12). Other examples include counting directive stripes in the cell, and counting peak and valley knots in the cell.

In general, a user can select his or her own image feature stripping methods to define image token patterns, whichever may best serve his or her interest in the image search.

Thus the scope of the invention should be determined by the appended claims and their legal equivalents, rather than by examples given.

The inventor claims:

1. A computer method for searching image documents containing non-word-based data, comprising the computer executed steps of:
(a) collecting a group of image documents to form a collection of image documents;
(b) dividing each document in said group of collected documents into an array of cells of same type, each of said cells of said array comprises a plurality of pixels;
(c) providing a plurality of non-word-based token patterns wherein said plurality of non-word-based token patterns are pre-defined and not derived from said image documents;
(d) tokenizing said documents by matching said array of cells against said plurality of pre-defined non-word-based token patterns to generate a collection of tokens for each of said documents, and providing a name for each of said tokens;
(e) combining the collections of tokens for said documents into a master collection of tokens;
(f) providing a query image, said query image is a part of an image document, and dividing said query into an array of cells, each of said cells of said array comprises a plurality of pixels;
(g) tokenizing said query image by matching said array of cells of said query image against said plurality of pre-defined non-word-based token patterns to generate a collection of tokens of said query image, and providing a name for each of said tokens;
(h) searching for image documents in said collection of documents that have the same tokens with the same position arrangement as said tokens of said query image by searching said query token names in said master collection of tokens, to provide a plurality of matching documents with respective scores; and
(i) displaying matching documents in the order of their matching scores.

2. The computer method of claim 1 wherein said collection of documents is supplied in a data source.

3. The computer method of claim 1 wherein said collection of documents is on the Internet and said collecting is done from the Internet.

4. The computer method of claim 1 wherein said plurality of image documents also contains word-based data.

5. A computer method for searching non-word-based documents containing data with m-measurements over n-dimensional space, comprising the computer executed steps of:
   (a) collecting a group of non-word-based documents of same type containing data with m-measurements over n-dimensional space to form a collection of documents;
   (b) dividing each document in said group of collected documents into a plurality of elements of same type;
   (c) providing a plurality of non-word-based token patterns wherein said plurality of non-word-based token patterns are pre-defined and not derived from said non-word-based documents;
   (d) tokenizing said collected non-word-based documents by matching their elements of same type against said plurality of pre-defined non-word-based token patterns to generate a master collection of tokens, and providing a name for each token;
   (e) searching for non-word-based documents in said collection of documents that have the same tokens as a query token or a combination of query tokens, said query is a part of a non-word-based document, by searching said query token or tokens in said generated master collection of tokens, to provide a plurality of matching documents with respective scores; and
   (f) displaying matching documents in the order of their matching scores.

6. The computer method of claim 5 wherein said collection of documents is supplied in a data source.

7. The computer method of claim 5 wherein said collection of documents is on the Internet and said collecting is done from the Internet.

8. A computer method for tokenizing a non-word-based document into a collection of tokens, comprising the computer executed steps of:
   (a) dividing said non-word-based document into a plurality of elements of same type;
   (b) providing a plurality of non-word-based token patterns wherein said plurality of non-word-based token patterns are pre-defined and not derived from said non-word-based document;
   (c) matching each of said plurality of elements of same type against each of said plurality of pre-defined non-word-based token patterns so as to generate a token for each match between an element and a pre-defined non-word-based token pattern, and providing a word-based name for each token; and
   (d) collecting all of said tokens in a collection of tokens, said collection of tokens is a word-based representation of said non-word-based document.

9. The method of claim 8 wherein said non-word-based document is supplied in a data source.

10. The method of claim 8 wherein said non-word-based document is on the Internet.

11. The method of claim 8 wherein said non-word-based document is one of: image document and document containing data with m-measurements over n-dimensional space.

* * * * *